(12) United States Patent
Gautron et al.

(10) Patent No.: US 12,490,663 B2
(45) Date of Patent: Dec. 9, 2025

(54) AGRICULTURAL MACHINE FOR DISTRIBUTING PRODUCT FOR FEEDING ANIMALS AND/OR FORMING THEIR BEDDING

(71) Applicant: KUHN-AUDUREAU SAS, La Copechagniere (FR)

(72) Inventors: Pascal Gautron, Saint-Fulgent (FR); Théo Desurier, La Roche-sur-Yon (FR)

(73) Assignee: KUHN-AUDUREAU SAS, La Copechagniere (FR)

( * ) Notice: Subject to any disclaimer, the term of this patent is extended or adjusted under 35 U.S.C. 154(b) by 0 days.

(21) Appl. No.: 18/786,144

(22) Filed: Jul. 26, 2024

(65) Prior Publication Data
US 2025/0031597 A1 Jan. 30, 2025

(30) Foreign Application Priority Data

Jul. 28, 2023 (FR) ...................................... 2308165

(51) Int. Cl.
*A01B 63/118* (2006.01)
*A01B 63/10* (2006.01)

(52) U.S. Cl.
CPC ............ *A01B 63/118* (2013.01); *A01B 63/10* (2013.01)

(58) Field of Classification Search
CPC ..... A01B 63/118; A01B 63/10; A01D 90/083; A01D 87/127; A01D 2087/128;
(Continued)

(56) References Cited

U.S. PATENT DOCUMENTS

| | | | | |
|---|---|---|---|---|
| 2,611,579 | A | * 9/1952 | Guzey, Jr. ................. | B66F 5/04 254/8 B |
| 2,981,425 | A | * 4/1961 | Hughes ................. | B60P 1/4407 414/546 |

(Continued)

FOREIGN PATENT DOCUMENTS

| | | | | |
|---|---|---|---|---|
| DE | 102012024767 A1 | * | 7/2013 | ........... A01D 90/083 |
| EP | 391804 A | * | 10/1990 | ........... A01D 90/083 |

(Continued)

OTHER PUBLICATIONS

Preliminary French Search Report issued Feb. 5, 2024 in French Application 2308165 filed on Jul. 28, 2023, 8 pages (with English Translation of Categories of Cited Documents & Written Opinion).

*Primary Examiner* — Gregory W Adams
(74) *Attorney, Agent, or Firm* — Oblon, McClelland, Maier & Neustadt, L.L.P.

(57) ABSTRACT

An agricultural machine for distributing product for feeding animals and/or forming their bedding, the agricultural distribution machine includes a casing and a loading door articulated in rotation on the casing about a first swivel axis, a complementary element articulated in rotation on the door about a second swivel axis and one main cylinder for operating the door, the or each main cylinder is articulated in rotation on the casing about a third swivel axis and on the complementary element about a fourth swivel axis and which further includes a rotation management device for the complementary element relative to the door including the or each main cylinder and one rotation switch configured to generate the rotational drive of the complementary element relative to the door based on the torque applied to the complementary element by the or each main cylinder.

9 Claims, 5 Drawing Sheets

(58) Field of Classification Search
CPC .... A01D 87/122; A01D 90/08; A01D 87/126;
B60P 1/4407; B60P 1/00; B60P 1/4414;
B60P 1/4471; B60P 1/48; A01F 15/071;
A61G 3/062
USPC ..... 414/24.5, 24.6, 546, 612, 419–421, 732,
414/733; 242/2 R, 403, 557
See application file for complete search history.

(56) References Cited

U.S. PATENT DOCUMENTS

| | | | | |
|---|---|---|---|---|
| 4,082,198 | A * | 4/1978 | Anderson | A01F 29/005 |
| | | | | 241/101.76 |
| 4,619,570 | A | 10/1986 | Siebenga | |
| 4,930,386 | A * | 6/1990 | Laskowski | B27B 31/04 |
| | | | | 83/928 |
| 5,340,259 | A * | 8/1994 | Flaskey | A01D 90/083 |
| | | | | 414/24.5 |
| 5,397,208 | A * | 3/1995 | Siebenga | A01D 87/127 |
| | | | | 414/556 |
| 5,864,101 | A * | 1/1999 | Nishizawa | B60P 1/4471 |
| | | | | 187/222 |
| 2011/0014022 | A1 | 1/2011 | Shoemaker et al. | |

FOREIGN PATENT DOCUMENTS

| | | |
|---|---|---|
| EP | 3 440 922 B1 | 7/2020 |
| FR | 2 773 947 A1 | 7/1999 |
| FR | 2789263 A1 * 8/2000 | ........... A01D 87/127 |

\* cited by examiner

AGRICULTURAL MACHINE FOR DISTRIBUTING PRODUCT FOR FEEDING ANIMALS AND/OR FORMING THEIR BEDDING

The present invention relates to the field of agricultural machines, and more particularly to agricultural machines for distributing product for feeding animals and/or forming their bedding. The subject of the present invention is such a machine.

These agricultural distribution machines are equipped with loading means in the form of a door for loading product for feeding animals and/or forming their bedding. This product, generally straw or hay in the form of bales produced by a baler, is loaded into a casing in the machine for distribution. They also include wheels to enable them moving over the ground.

The door is mounted so that it can swing about an axis located at the lower part of the machine casing. The door is operated by at least one hydraulic cylinder articulated in rotation on the casing and the door. The door is located at the rear of the casing and swings between a closed and an open position. In particular, the door makes it possible to close off a loading opening in the casing, usually at the rear of the casing. The open position of the door allows the product to be loaded into the distribution machine casing.

However, the door does not allow a bale lying on the ground to be picked up directly and fed into the casing. Document FR2773947 provides a solution to this problem with a device enabling the operator to load a bale directly. The device includes a complementary element that can be slid under the bale after correctly positioning the rear part of the casing, containing the door, relative to the bale to be loaded. The complementary element extends from the door and in line with the latter when it rests on the ground. The complementary element, in the form of an arch, is articulated about a swivel axis parallel to the swivel axis of the door on the casing. When the door loaded with the bale is raised to its closed position to feed the bale into the casing, the complementary element is actuated to be brought to an inclined position relative to the door, by suitable means, to support and block the bale and prevent it from escaping by gravity. The legs of the arch are articulated on axes arranged laterally at the end of the door and, for at least one of them, are connected by means of a lateral connecting-rod to the fixed rear part of the casing so that, when the door is maneuvered, a combined movement of the arch is induced, which makes it easier for the door to pick up the bale and feed it into the casing. The ends of each lateral leg are connected by lateral connecting-rods to axes located on the sides of the casing, above the (pivot) articulation axes of the rear door.

However, in such a device, due to the movement of the complementary element associated/combined with the movement of the door, and in particular the cylinder of the door, the movement of the complementary element is entirely dependent on the movement of the door. For each door opening/closing angle (or each door rotation position), the device thus ensures a single position (or orientation) of the complementary element relative to the door. Under certain conditions, for example when the machine is operating in a sloping farmyard, loading the bale will be more difficult, as the bale will have to overcome the obstacle formed by the door or by the complementary element, since at least one of these two elements (door and complementary element) will not be in a suitable position. Furthermore, as a result of such a combined movement, when the door is closed, the complementary element remains in the same position as that allowing the bale to be blocked (forming a folded position with respect to the plane of the door) and extends at least into, or even above, the casing, which has the effect of creating an obstacle to top loading. In addition, the position of the complementary element is fixed above the casing when the door is closed. This position of the complementary element therefore increases the height of the machine and prevents the distribution machine from being used in certain barns, where the access door is too low.

The present invention aims to overcome these drawbacks by proposing an agricultural machine for distributing product for feeding animals and/or forming their bedding, offering greater versatility and better adaptation to the environment and to loading and operating conditions.

The agricultural machine for distributing product for feeding animals and/or forming their bedding according to the present invention, the agricultural distribution machine comprising a casing and a loading door articulated in rotation on the casing about a first swivel axis, a complementary element articulated in rotation on the door about a second swivel axis and at least one main cylinder for operating the door, is characterized in that the or each main cylinder is articulated in rotation on the casing about a third swivel axis and on the complementary element about a fourth swivel axis, and in that it further comprises a rotation management device for the complementary element relative to the door, the management device comprising the or each main cylinder and at least one rotation switch, configured to generate the rotational drive to the complementary element relative to the door, based on the torque applied to the complementary element by the or each main cylinder.

In one variant, the agricultural machine for distributing product for feeding animals and/or forming their bedding according to the present invention, the agricultural distribution machine comprising a casing and a product loading door articulated in rotation on the casing about a first swivel axis, a complementary element articulated in rotation on the door about a second swivel axis and at least one main cylinder for operating the door articulated in rotation on the casing about a third swivel axis and on the door about a fourth swivel axis, is characterized in that it further comprises a rotation management device for the complementary element relative to the door, comprising:
  at least one complementary cylinder different from the or each main cylinder and articulated in rotation on the door about a fifth swivel axis and on the complementary element about a sixth swivel axis, the operation of the or each complementary cylinder generating the rotational drive to the complementary element relative to the door,
  at least one control circuit for the or each complementary cylinder.

The invention will be better understood from the following description, which refers to a preferred embodiment given as a non-limiting example and explained with reference to the attached schematic drawings, in which.

Figure 1:
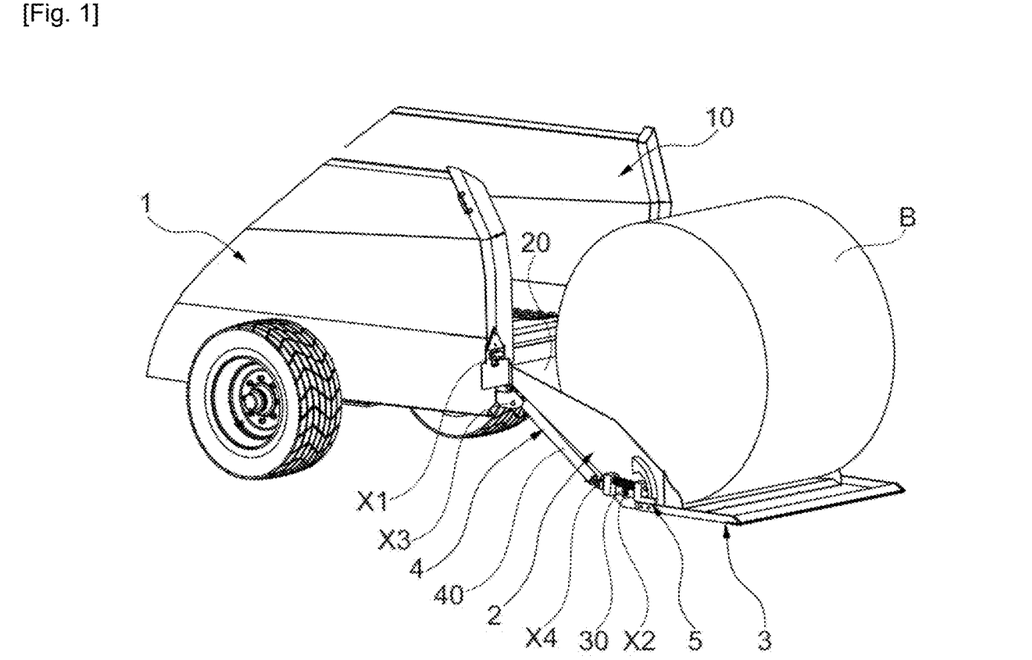
FIG. 1 is a perspective view of the rear of an agricultural distribution machine, according to the present invention, with a bale loaded on the door which is open, with the door and the complementary element resting on the ground.
Figure 2:
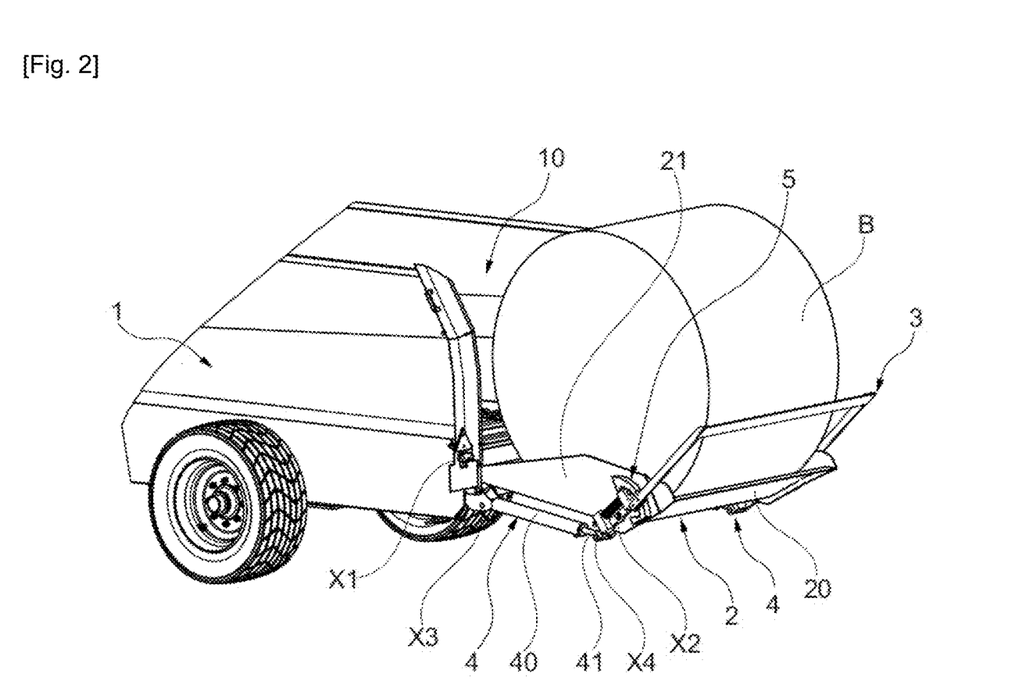
FIG. 2 shows the agricultural distribution machine shown in FIG. 1, the door of which is in an intermediate position between its open position shown in FIG. 1 and its closed position, with the complementary element in a folded position allowing to hold the bale on the door.

The appended figures show an agricultural machine for distributing product B for feeding animals and/or forming their bedding. The agricultural distribution machine comprises a casing 1 and a loading door 2 articulated in rotation on the casing 1 about a first swivel axis X1, a complementary element 3 articulated in rotation on the door 2 about a second swivel axis X2 and at least one main cylinder 4 for operating the door 2. The door 2 advantageously extends to the rear of the casing 1. The door 2 is thus able to swing from a closed position to an open position and vice versa. In FIG. 1, the door 2 fastened at the rear of the casing 1 is open and rests on the ground. In the remainder of the description, the term "product" will be used in the singular to designate straw or hay, for example. The product is in the form of a bale, for example a cylindrical bale. Such a bale of product B can be loaded on the door 2. The complementary element 3 extends in line with the door and also rests on the ground S. In FIG. 2, the door 2 extends in an intermediate position, in which it is raised from the ground S. In this intermediate position, the cylindrical bale is held balanced in the door 2. In this position, for example, the ties surrounding the bale can be cut before it enters the casing 1 for distribution. When the door 2 moves from its open position to its closed position and vice versa, it necessarily passes through the intermediate position.

The or each main cylinder 4 is articulated in rotation on the casing 1, preferably on the lower part of the casing 1, about a third swivel axis X3. Preferably, the third swivel axis X3 is located below the first swivel axis X1, as shown in FIGS. 1, 2, 3 and 5 to 7. In the preferred embodiment, rotation of the door 2 is controlled by two main cylinders 4, as shown in FIG. 2. A main cylinder 4 is placed on each side of the door 2. In an alternative not shown, the present invention can provide a single main cylinder 4 to control the door 2 which can, preferably, be placed in the middle of the door 2 and, preferably, in the middle of the casing 1.

Figure 8:
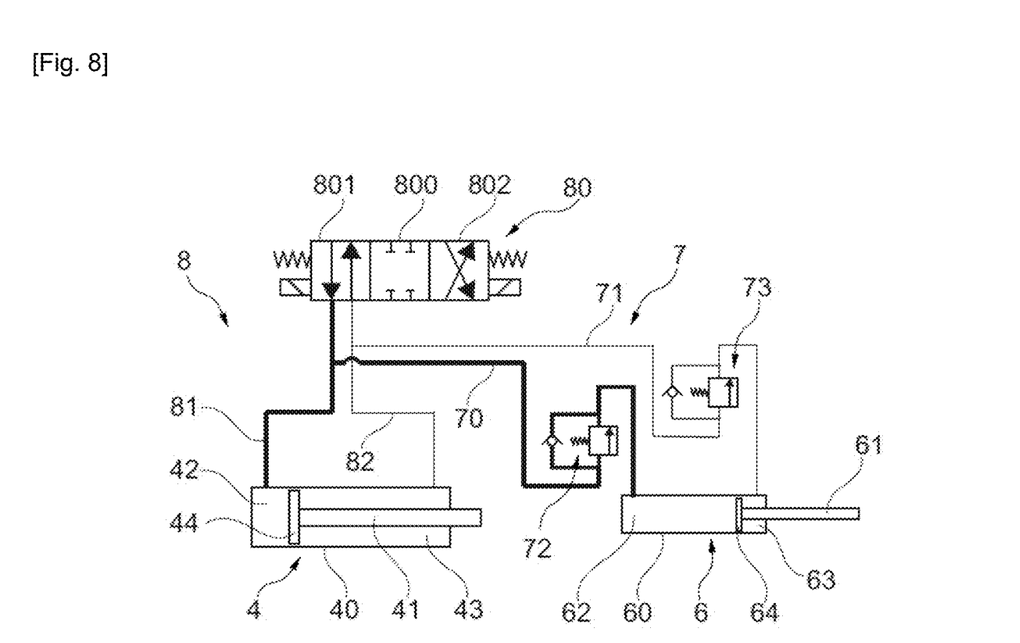
FIG. 8 shows the control circuit of the complementary cylinder of the management device in FIG. 7 in a special embodiment connected to the control circuit of the main cylinder.

Preferably, the or each main cylinder 4 can be a double-acting single-rod cylinder (equipped with a single rod 41) comprising a piston 44 connected to the rod 41 and separating two chambers 42, 43 each containing a pressurized fluid, i.e. a small chamber 43 in which the rod 41 is located, and a large chamber 42 on the opposite side (see in particular FIG. 8). The control circuit for such a cylinder is known, and may in particular include an electrically-controlled distributor 80 to alternately enable one of the chambers 42, 43 to be placed in fluid communication with the fluid source, and the other chamber 42, 43 with a tank (not shown) containing the pressurized fluid, in order to control the movement of the piston 44 and therefore of the rod 41. In this way, the or each main cylinder 4 can be controlled so that extending the rod 41 rotates the door 2 in the direction of rotation towards its closed position, and retracting the rod 41 rotates the door 2 in the opposite direction towards its open position.

Figure 3:
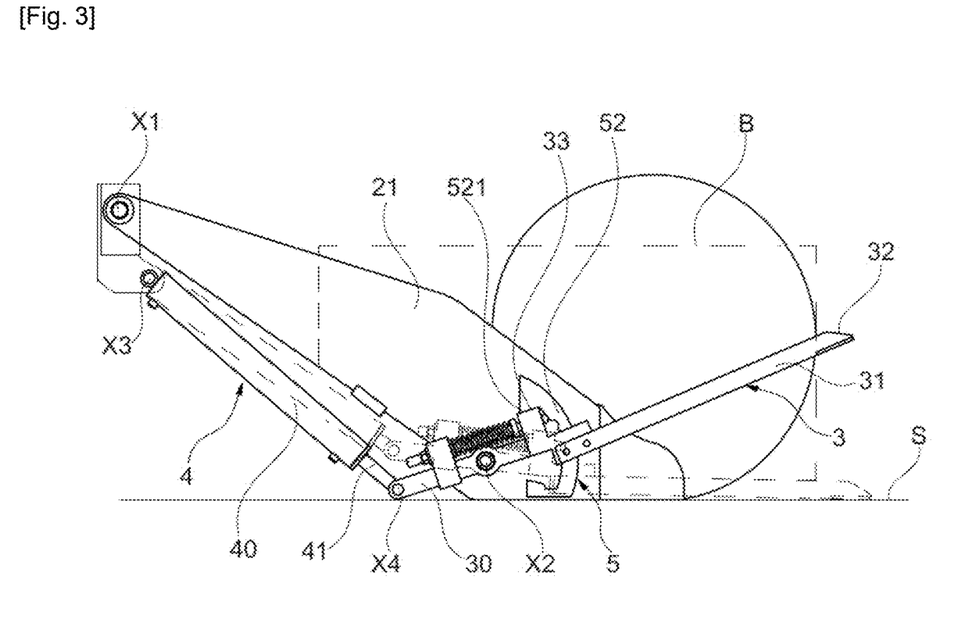
FIG. 3 is a profile view of the door, with dashed lines showing the complementary element and the main cylinder in the unfolded position of FIG. 1, and solid lines showing the complementary element in its folded position.

As shown in FIGS. 1, 2 and 5 to 7, the casing 1 can comprise a loading opening 10. The loading opening 10 is located at the rear of the casing 1 (or of the machine) to allow loading of product packaged in bale form in reverse, when the door is in the open position. Preferably, the casing 1 can comprise two walls defining between them a space at the rear of the casing forming the loading opening 10. The door 2, in its closed position, allows the closing of the loading opening 10. The casing is advantageously formed by the two side walls of the casing 1 and the loading door 2. An unraveling and ejection device is located at the front of the casing 1. The bottom of the casing 1 consists of a floor equipped with a displacement device. This displacement device enables the product to be moved from the rear to the front of the casing 1. The product is moved to the unraveling and ejection device. The door 2 is mounted in rotation, and more specifically able to swing between the closed position of the loading opening 10 (FIGS. 5, 6) and an open position. In the open position, the door 2 rests on the ground S (FIGS. 1, 3). The door 2 can be controlled so as to be held in an intermediate open position between the closed position and the open position on the ground S. In the open position on the ground S, a bale of product B can be loaded in door 2 (FIGS. 1 and 3) for feeding into the casing 1 by the closing of the door 2.

Figure 5:
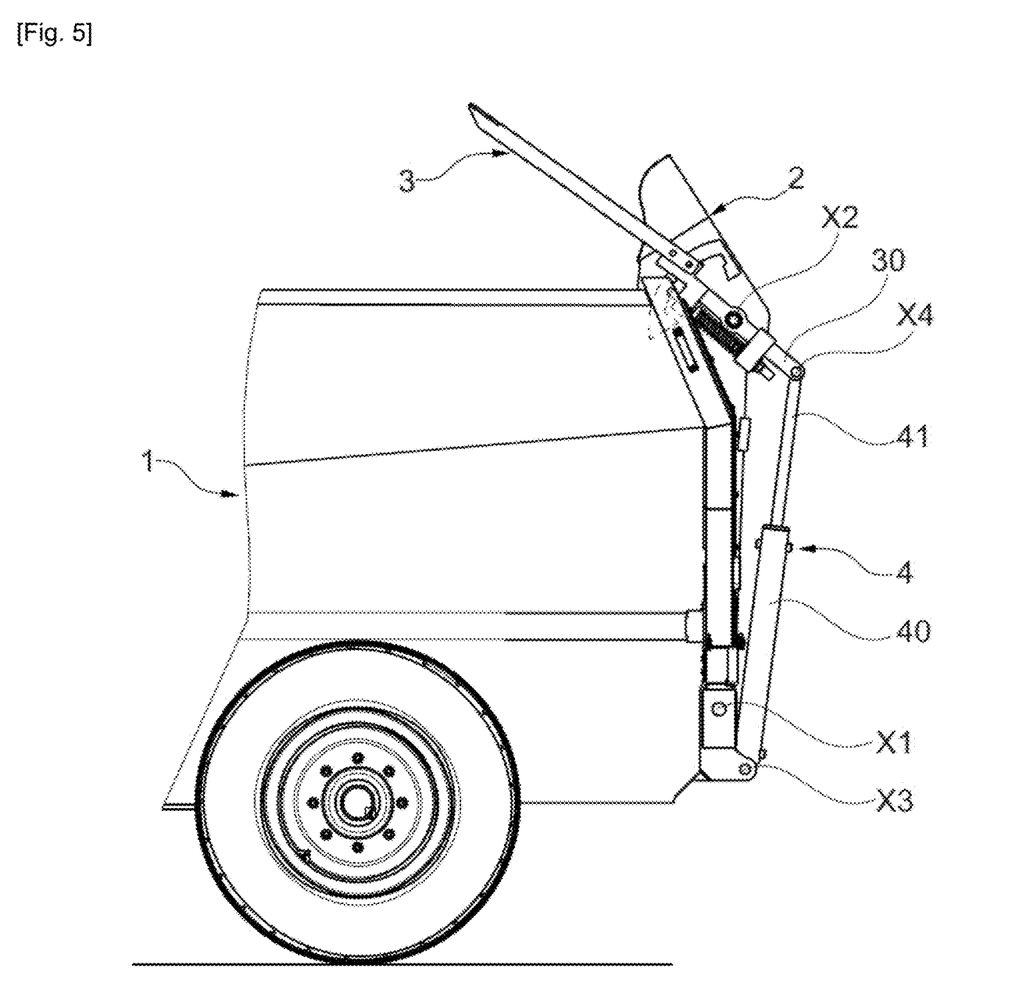
FIG. 5 is a profile view of the agricultural distribution machine shown in FIG. 1, with the door in the closed position and the complementary element in the folded position.
Figure 6:
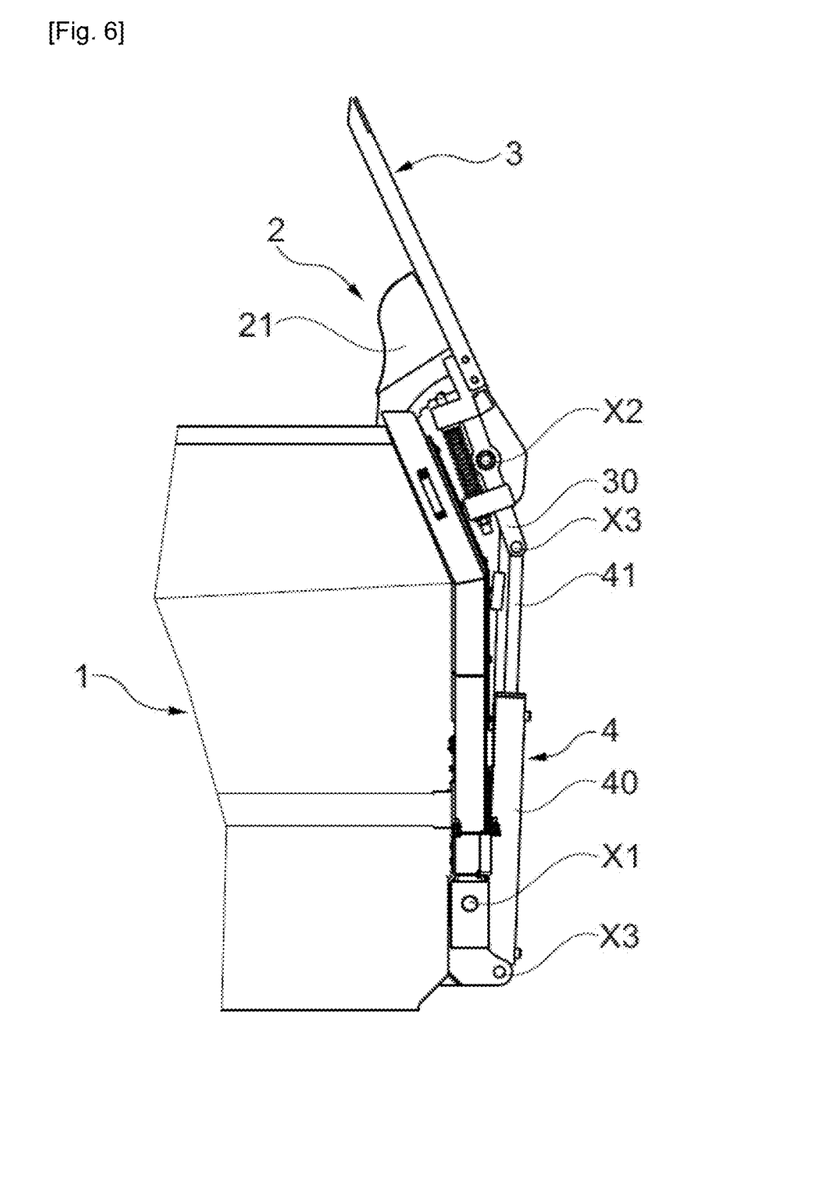
FIG. 6 shows the door shown in FIG. 5 with the complementary element in the unfolded position.

When the door 2 is in the closed position, as shown in FIGS. 5 and 6, the packaged product (cylindrical or rectangular cuboid bale) loaded in casing 1 can be conveyed from a storage area to a barn with livestock. The product can also be transported unpackaged. When the door 2 is closed, the loading opening 10 is closed and the product remains enclosed in the casing 1. The packaged or unpackaged product can then be processed and/or distributed at the intended location by the distribution machine.

Preferably, the door 2 can be mounted in rotation at the lower part of the casing 1. Preferably, the door 2 can consist of a platform 20, with or without apertures, suitable for supporting the product B, particularly in the form of a bale. The platform 20 can be laterally fitted with flanks 21 enabling the product B to be held on the platform 20. A flank 21 extends on either side of the platform 20. The platform 20 can comprise a base (FIGS. 1, 2, 3, 5, 6 and 7) enabling the end of the door 2 to rest on a ground S. When the base is substantially flat on horizontal ground S, then the platform 20 is inclined relative to the ground S (see FIG. 3 in particular). The base is located in line with the platform 20 and is oriented so that it can pick up a bale of product B.

The swivel axis X1 of the door 2 can be made from one or more pivot connections (or joints), for example two pivot connections arranged on either side of the casing 1.

To enable the product B to be loaded in the door 2, the latter is equipped with the complementary element 3 which can, in a suitable rotation position called the unfolded position, rest on the ground S in order to slide, with a spade-like effect, under the product B, in particular under a bale of product B, for example with a rearward movement of the agricultural machine. The complementary element 3 has a shape to retain the bale when the door 2 swings. As shown in FIGS. 1, 2, 3 and 7, the complementary element 3 can be shaped like an arch. It can be U-shaped, with each leg 31 mounted in rotation about the respective second swivel axis X2. Each leg 31, for example, is articulated about a pivot forming the swivel axis X2 and is fastened to one of the sides of the door 2. The base 32 of the U connecting the legs 31 can form an end bar parallel to the end part of the door 2 and/or to the swivel axis X1 of the door on the casing 1. In a folded position, the complementary element 3 also makes it possible to hold the bale of product B in the door 2, more particularly at the end thereof, during the closing phase of the door 2, in other words for as long as the door 2 is in a rotation position with an inclination that automatically drives the product B into the casing 1 by gravity. In a folded position, the complementary element 3 also makes it possible to retain the bale after the surrounding net or string (not shown) keeping it in shape has been cut. FIG. 3 shows this folded position of the complementary element 3 in solid lines. Instead of being cylindrical, the bale of product B can be a rectangular cuboid shape. In the case of a rectangular cuboid-shaped bale, as illustrated in dashed lines on FIG. 3, the complementary element 3 makes it possible to extend the end part of the door 2 to ensure that the bale remains on the door 2 when it swings towards the closed position and is loaded into the casing 1.

Preferably, the first, second, third and fourth swivel axes X1, X2, X3 and X4 are parallel to one other. Preferably, the first and third swivel axes X1 and X3 can extend to the casing 1, while the second and fourth swivel axes X2 and X4 can extend to the door 2. Preferably, the first swivel axis X1 is close to, in other words in the vicinity of, the third swivel axis X3 and/or the second swivel axis X2 is close to, in other words in the vicinity of, the fourth swivel axis X4.

Preferably, the swivel axis X2 of the complementary element 3 can be located close to the free end of the door 2. If required, the swivel axis X2 can be located close to the end part of the door 2, i.e. opposite the swivel axis X1 of the door 2 on the casing 1.

In accordance with the present invention, the agricultural distribution machine further comprises a rotation management device for the complementary element 3 in relation to the door 2. Thanks to this management device, the complementary element 3 can be placed in different positions in relation to that of the door 2. In this way, the distribution machine adapts better to the environment, and the operating and loading conditions are improved.

By management device, one should understand a device making it possible to manage the rotation of the complementary element 3 independently of the position of the loading door 2. Thus, for at least one position of the door 2, the complementary element 3 can be controlled in at least two different rotation positions. For example, as shown in FIG. 3, the complementary element 3 can be controlled in at least two different rotation positions when the door 2 is resting on the ground S in its open position. In FIG. 3, the complementary element 3, shown in solid lines, is in a folded position which, for example, ensures that the cylindrical bale is held in place, while the complementary element 3, shown in dashed lines, is unfolded in order to receive or load a bale of product B. Similarly for the closed position of the door 2, the complementary element 3 can extend into at least two different positions, see FIGS. 5 and 6. The complementary element 3 in FIG. 6 is unfolded, whereas it is folded in FIG. 5. Folding the complementary element 3 as shown in FIG. 5 makes it possible to reduce the height of the agricultural distribution machine to allow it accessing to buildings with limited access height. The unfolded position of the complementary element 3 (FIG. 6) advantageously allows top loading of the casing 1, with the door 2 in its closed position. The position of the complementary element 3 of the present invention is therefore not limited to the position of the door 2, thus increasing the versatility of the distribution machine.

FIGS. 1 to 6 show an agricultural distribution machine according to the present invention, in which the or each main cylinder 4 is articulated in rotation on the casing 1 about the third swivel axis X3 and on the complementary element 3 about a fourth swivel axis X4. In this variant, the rotation management device of the complementary element 3 relative to the door 2 comprises the or each main cylinder 4 and at least one rotation switch 5 configured to generate the rotational drive of the complementary element 3 relative to the door 2, based on the torque applied to the complementary element 3 by the or each main cylinder 4. Preferably, the or each main cylinder 4 is a double-acting cylinder allowing to swing the door 2 from an open position to a closed position and vice versa.

In this variant, the body 40 of the or each main cylinder 4 can be articulated in rotation on the casing 1 about the third swivel axis X3, and the rod 41 of the or each main cylinder 4 can be mounted in rotation, at its end, on the complementary element 3 about the fourth swivel axis X4. In a further embodiment not shown, the body of the or each main cylinder 4 can be articulated in rotation on the complementary element by means of the fourth swivel axis X4, and the rod of the or each main cylinder 4 can be fastened to the casing by means of the third swivel axis X3.

In a preferred embodiment, the at least one rotation switch 5 is configured to generate the rotational drive of the complementary element 3 relative to the door 2 when the torque applied by the or each main cylinder 4 to the complementary element 3 is greater than a retaining force applied by the switch(es) 5 on the complementary element 3 and opposing the rotation of the complementary element 3, then to generate the rotational drive of the door 2 equipped with the complementary element 3 when the torque applied by the or each main cylinder 4 to the complementary element 3 is less than the retaining force.

Preferably, the at least one rotation switch 5 can extend substantially in the vicinity of the second swivel axis X2. According to a preferred embodiment, a rotation switch 5 is provided on each of the flanks 21 of the door 2. Only one of the rotation switches 5 (on the left-hand side for an observer looking at the rear of the machine/casing) is visible in the figures.

Preferably, as shown in FIGS. 1 to 6, the or each main cylinder 4 can be articulated (about the fourth swivel axis X4) on a lever arm 30 formed by part of the complementary element 3. The lever arm 30 can be integrated into the complementary element 3 (produced as a single piece with the latter during manufacture) or attached to/on it. The lever arm 30 can extend between the second swivel axis X2 and the fourth swivel axis X4.

In a preferred embodiment, the or each rotation switch 5 may comprise a driven lock 50 and a spring 51 rigidly fastened to the complementary element 3 or door 2, respectively, and a cam and indexing track 52 cooperating with the driven lock 50 and being rigidly fastened to the door 2 or complementary element 3 respectively, comprising at least two indexing notches 520, preferably in the form of a circular arc, each able to receive, under the effect of the resetting force of the spring 51 exerted on the driven lock 50, one end 500 of the driven lock 50. Each indexing notch 520 thus defines a predetermined position of the complementary element 3 relative to the door 2. The resetting (or preload) force of the spring 51 provides/corresponds to the abovementioned retaining force. It can be considered that the first indexing notch 520 is the one closest to the platform 20 of the door 2.

Figure 4:
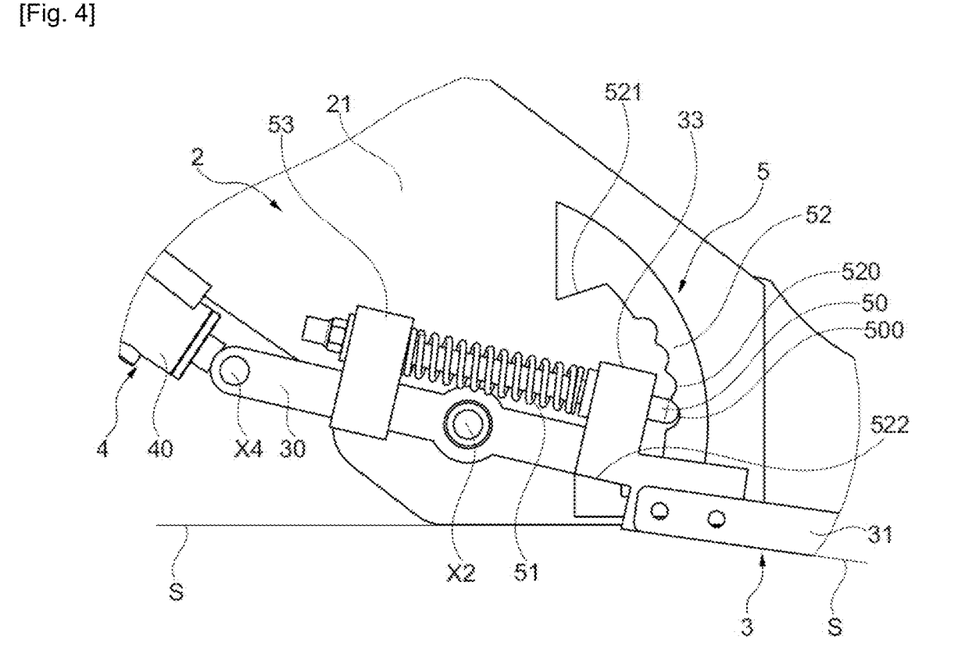
FIG. 4 is a detailed view of the rotation switch mounted on one side of the door, in an unfolded position of the complementary element adapted to sloping ground.

Preferably, and according to FIG. 4, the cam and indexing track 52 has a circular arc of teeth. The various indexing notches 520 form the circular arc of teeth. The lock 50 is then made radially movable with respect to the cam and indexing track 52. A bearing system 53 rigidly fastened to the complementary element 3 makes it possible to guide the driven lock 50.

Preferably, the cam and indexing track 52 comprises at least one stop 521, 522. According to the embodiment shown in FIG. 4, the cam and indexing track 52 has two end-of-travel stops 521, 522, respectively an upper stop 521 and a lower stop 522. The complementary element 3, for its part, has at least one contact face 33 able and intended to abut one of the stops 521, 522. The upper stop 521 defines a rotation limit of the complementary element 3 in the folded position (FIGS. 2, 3 and 5) and the lower stop 522 defines a rotation limit of the complementary element 3 in the unfolded position (FIGS. 1, 3, 4 and 6). The stops 521, 522 allow limiting the angle of rotation of the complementary element 3 relative to the door 2 and about the second swivel axis X2. In FIGS. 2 and 3, the complementary element 3 is shown in a folded position (at the end of travel) making it possible to retain the bale of product B in the door 2. The door, for its part, is in an intermediate position (FIG. 2) or in an open position (FIG. 3). The contact face 33 rests on the upper stop 521 and the end 500 of the driven lock 50 is placed in the last notch 520 of the cam and indexing track 52. FIG. 5 shows the complementary element 3 in its folded position and the door 2 in its closed position. The contact face 33 of the complementary element 3 rests on the upper stop 521. This end-of-travel position may correspond to the last indexing notch 520 of the cam and indexing track 52.

The longitudinal axis of the driven lock 50 is preferably substantially parallel to the plane perpendicularly intersecting the mutually parallel second and fourth swivel axes X2 and X4.

Particularly advantageously, the complementary element 3 can only pivot if the torque applied on the complementary element 3 about the second swivel axis X2 by the main cylinder 4 exceeds the retaining force, i.e. the compression force of the spring 51.

In another embodiment, not shown, the or each rotation switch 5 may consist of a friction mechanism or a cylinder and accumulator type mechanism.

The operation of the management device may be as follows, considering a management device comprising a main cylinder 4 and a rotation switch 5 on either side of the door 2:

For the closing phase of the door 2, the door 2 and the complementary element 3 rest on the ground S (see in particular FIGS. 1 and 4). The door 2 is in its open position and the complementary element 3 is in an unfolded position. In FIG. 1, the ground S is substantially horizontal and the end 500 of the driven lock 50 is positioned in the second indexing notch 520, starting from the platform 20 of the door 2. The complementary element 3 is substantially aligned with the base of the door 2 (as shown in FIG. 3 in dashed lines). In FIG. 4, one can see that part of the ground S is not horizontal, but slightly sloping, and that the end 500 of the driven lock 50 is inserted into the first indexing notch 520. Thanks to this additional position (this first notch), the complementary element can adapt freely and follow the slope of the ground S to make loading of the bale of product B easier. The additional position allows the base of the door 2 and the complementary element 3 to rest on the ground S. With a distribution machine of this type, a door 2 closing phase with a bale of product B and a door 2 closing phase without a bale of product B have to be considered.

In the absence of product B loaded on the door 2, the force required to move the door 2 upwards to the closed position is low.

The resulting force in the main cylinder 4 is also low. The torque generated at the point of rotation between the complementary element 3 and the door 2, i.e. about the second swivel axis X2, remains low. The contact force resulting from this torque between the driven lock 50 and the cam and indexing track 52 does not allow to compress the spring 51 (force less than the resetting force of the spring 51). As a result, the driven lock 50 does not move, and the end 500 remains in its indexing notch 520. The complementary element 3 does not move relative to the door 2, which swings upwards under the effect of the extension of the rod 41 of the main cylinder 4. The door 2 and the complementary element 3 thus raise until the door 2 abuts against the threshold of the loading opening 10 of the casing 1. During this swinging of the door 2, the complementary element 3 keeps its position in the indexing notch 520. When the door 2 comes to rest on the threshold of the loading opening 10 (FIG. 6), the force in the or each main cylinder 4 increases, with the result that the compression force of the spring 51 increases until it reaches the resetting (or preload) force value of the spring 51, resulting in compression of the spring 51 and hence a withdrawal of the driven lock 50 (more particularly its end 500) from the first or second indexing notch 520. When the force is sufficient, the driven lock 50 passes the first or second indexing notch 520, then the other indexing notches 520 successively, generating a displacement of the driven lock 50 relative to the cam and indexing path 52. This causes the complementary element 3 to pivot relative to the door 2, and the complementary element 3 folds back to get closer to the casing 1. If the force drops below the preload value, the resetting force causes the driven lock 50 to engage in the relevant indexing notch 520, and the rotation movement of the complementary element 3 relative to the door 2 stops.

With product B loaded on the door 2, the effort required to move the door 2 is greater than when unloaded, due to the weight of the load (product B). The load of several hundred kilograms on the door 2 overcomes the resetting force of the spring 51, generating a rotational movement of the complementary element 3 relative to the door 2. The management device therefore allows the complementary element 3 to pivot into its folded position without moving the door 2. When the main cylinder 4 is operated to raise the loaded door 2, the complementary element 3 pivots first through the rotation switch 5. If the torque of the main cylinder 4 on the door 2 increases sufficiently, the door 2 is lifted from the ground S rotating about the first swivel axis X1, otherwise the rotational movement of the complementary element 3 continues as far as the contact face 33. When the door 2 reaches the stop, the force in the main cylinder 4 increases further, enabling the door 2 to be raised in order to feed the bale of product B into the casing 1.

In the opening phase of the door 2, starting from the closed position in abutment against the threshold of the loading opening 10 of the casing 1 and from a folded position of the complementary element 3 at the end of travel, the force required to move the door 2 is low. The resulting force in the main cylinder 4 is also low. The torque generated on the complementary element 3 about the second swivel axis X2 therefore remains low. The contact force resulting from this torque between the driven lock 50 and the cam and indexing track 52 does not make it possible to compress the spring 51 (force less than the resetting force of the spring 51). As a result, the driven lock 50 does not move and the complementary element 3 keeps its position relative to the door 2, which is driven in rotation. The door 2 will thus lower under the effect of the retraction of the rod 41 of the main cylinder 4, until it comes in abutment against the ground S. When the door 2 comes in abutment on the ground S, the force in the main cylinder 4 increases, and this has an impact on the compression force of the spring 51, which increases until it reaches the spring resetting force (preload) value. Only the spring 51 is then compressed, causing the driven lock 50 to retract and thus the driven lock 50 to move relative to the cam and indexing track 52. This generates a rotational movement of the complementary element 3 relative to the door 2. When the force is sufficient, the driven lock 50 successively passes the indexing notches 520 until it reaches the first or second indexing notch 520. If the force decreases below the resetting force value (below the preload value), the rotational movement of the complementary element 3 stops. In this way, the pivoting of the complementary element 3 is controlled. The complementary element 3 pivots towards the ground S until it in turn reaches the ground S, adapting in particular to the slope of the ground S. This method of operation for the door 2 opening phase is identical whether the door 2 is empty or loaded.

The front part of the machine can be fitted with a hitching system, enabling it to be mounted on the three-point hitch of a tractor. A mounted machine has no axle and no wheels. As a variant, the casing 1 has wheels and the machine is fitted with a coupling drawbar so that it can be pulled behind a tractor. Only the rear part of the agricultural distribution machine is shown in FIGS. 1, 2 and 5. The agricultural distribution machine is, for example, of the straw-bedder type, allowing the product B to be loaded in bale form on the door, to transfer the product B in bale form into the casing 1 to be shredded and distributed over the ground S in the form of a windrow on a feeding area, or else distributed widely over the surface of the ground S thanks to a blower that ejects the straw several meters away. Typically, such a bale is loaded into the casing 1 by means of the door 2. The bale is loaded on the door 2 in its open position by reversing the tractor. The complementary element 3, then the door 2, placed on the ground, pass successively under the bale to load it when reversing. It is also possible to load the bale directly onto the platform of the door using another tractor. Once the bale has been loaded onto the door 2 placed on the ground, the operator will fold the complementary element 3 as shown in FIG. 3 (solid lines) using the rotation switch 5 and the main cylinder 4, and then raise the door 2 to an intermediate position, such as for example the one shown in FIG. 2, to cut and remove the ties surrounding the product. Once the ties have been removed, the operator climbs back into the tractor to switch the door 2 to its closed position, thus transferring the bale into the casing 1.

Figure 7:
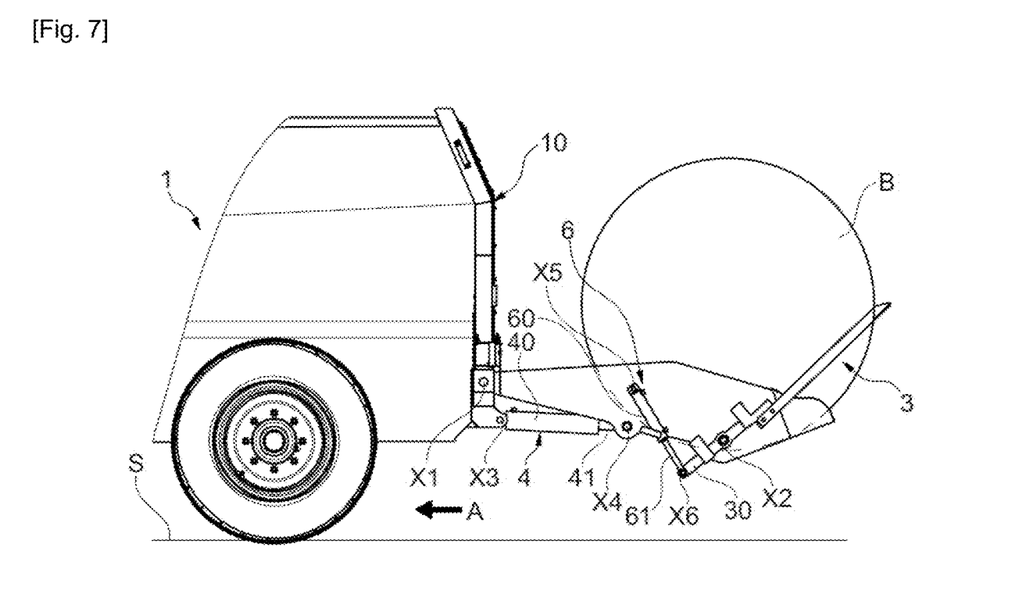
FIG. 7 shows a profile view of a variant of an agricultural distribution machine, with the door in an intermediate position.

FIG. 7 shows a variant of the agricultural machine for distributing product B for feeding animals and/or forming their bedding. In this variant, the door 2 and complementary element 3 are each controlled by at least one respective cylinder. The door 2 is operated by the at least one main cylinder 4, which is articulated in rotation on one hand on the casing 1 about the third swivel axis X3 and on another hand on the door 2 about a fourth swivel axis X4. The complementary element 3 is operated by at least one complementary cylinder 6. The management device comprises on one hand at least one complementary cylinder 6 different from the or each main cylinder 4 and articulated in rotation on the door 2 about a fifth swivel axis X5, and on the complementary element 3 about a sixth swivel axis X6, operation of the or each complementary cylinder 6 generating the rotational drive of the complementary element 3 relative to the door 2 and, on another hand, at least one control circuit 7 for the or each complementary cylinder 6. FIG. 8 shows the control circuit for the complementary cylinder 6 connected to the control circuit of the main cylinder 4.

Preferably, the or each complementary cylinder 6 may comprise a body 60 articulated in rotation on the door 2, preferably on one of the flanks 21 of the door 2, preferably on the outer face of the flank 21, about the fifth swivel axis X5, and a rod 61 articulated in rotation at its end on the complementary element 3 about the sixth swivel axis X6.

Preferably, the or each complementary cylinder 6 is a double-acting single-rod cylinder (equipped with a single rod 61) comprising a piston 64 connected to the rod 61 and separating two chambers 62 and 63, each containing a pressurized fluid, namely a small chamber 63 in which the rod 61 is located, and a large chamber 62 on the opposite side.

In a preferred embodiment, as shown in FIG. 8, a or each control circuit 7 is configured to control operation of the or each complementary cylinder 6 based on the control pressure of the or each main cylinder 4.

The control circuit 8 of the or each main cylinder 4 may comprise a three-valve distributor 80, with a first main pipe 81 connecting the large chamber 42 of the main cylinder 4 to the distributor 80 and a second main pipe 82 connecting the small chamber 43 to the distributor 80. The distributor 80 can have three positions, namely a resting position 800 (valve in central position), a first work position 801 (valve moved to the right as shown in FIG. 8) and a second work position 802 (valve moved to the left). The control circuit 7 of the or each complementary cylinder 6 may comprise a first additional pipe 70, a second additional pipe 71, a first pressure limiter 72 and a second pressure limiter 73. The first additional pipe 70 connects the large chamber 62 of the complementary cylinder 6 to the first main pipe 81 via the first pressure limiter 72, and the second additional pipe 71 connects the small chamber 63 to the second main pipe 82 via the second pressure limiter 73.

More specifically, the circuit (thin lines) comprising the second main 82 and additional 71 pipes allows to control the lowering (movement towards the closed position) of the door 2 and at least several positions of the complementary element 3. The circuit (thick lines) comprising the first main 81 and additional 70 pipes allows to control the raising of the door 2 and at least several positions of the complementary element 3.

To raise (or close) the door 2, the distributor 80 is controlled so as to convey pressurized oil, on one hand, by means of the first main pipe 81 into the large chamber 42 of the main cylinder 4 (operating the door 2) and on another hand, by means of the first additional pipe 70 into the large chamber 62 of the complementary cylinder 6. If the door 2 is empty (no product B loaded), the first pressure limiter 72 "blocks" the flow of pressurized oil to the large chamber 62 of the complementary cylinder 6, and the door 2 rises to its upper stop, i.e. in abutment against the threshold of the loading opening 10. When the door 2 abuts against the threshold of the loading opening 10, the pressure in the first additional pipe 70 increases, due to its connection with the first main pipe 81, and the first pressure limiter 72 therefore "releases" the flow of pressurized oil to the large chamber 62 of the complementary cylinder 6, causing the rod 61 to extend and the complementary element 3 to rotate, thus enabling it to fold back.

To lower (or open) the door 2, the distributor 80 is controlled so as to convey pressurized oil, on one hand, by means of the second main pipe 82 into the small chamber 43 of the main cylinder 4, and on another hand, by means of the second additional pipe 71 into the small chamber 63 of the complementary cylinder 6. The door 2 being empty, the second pressure limiter 73 "blocks" the passage to the small chamber 63 of the complementary cylinder 6, and the door 2 lowers (or opens) until it touches the ground S. When the door 2 comes into contact with the ground S, the pressure in the second additional pipe 71 increases and the second pressure limiter 73 "releases" the passage to the small chamber 63 of the complementary cylinder 6, thus retracting the rod 61 and driving the complementary element 3 in rotation in the opposite direction, thus allowing it to unfold.

Obviously, the invention is not limited to the embodiments described and shown in the attached drawings. Modifications remain possible, in particular as regards the composition of the various elements or by substitution of technical equivalents without departing from the scope of protection of the invention.

The invention claimed is:

1. An agricultural machine for distributing product for feeding animals and/or forming their bedding, the agricultural distribution machine comprising a casing and a loading door articulated in rotation on the casing about a first swivel axis, a complementary element articulated in rotation on the door about a second swivel axis and a main cylinder for operating the door, wherein the main cylinder is articulated in rotation on the casing about a third swivel axis and on the complementary element about a fourth swivel axis, and which further comprises a rotation management device for the complementary element relative to the door, the management device including the main cylinder and a rotation switch, configured to generate the rotational drive of the complementary element relative to the door, based on the torque applied to the complementary element by the main cylinder.

2. The agricultural distribution machine according to claim 1, wherein the one rotation switch is configured to:
   generate the rotational drive of the complementary element relative to the door when the torque applied by the main cylinder to the complementary element is greater than a retaining force applied by the switch(es) to the complementary element and opposing the rotation of the complementary element,
   generate the rotational drive of the door equipped with the complementary element when the torque applied by the main cylinder to the complementary element is less than the retaining force.

3. The agricultural distribution machine according to claim 1, wherein the one rotation switch extends substantially in the vicinity of the second swivel axis.

4. The agricultural distribution machine according to claim 1, wherein the main cylinder is articulated on a lever arm formed by a part of the complementary element.

5. The agricultural distribution machine according to claim 1, wherein the main cylinder comprises a body articulated in rotation on the lower part of the casing about the third swivel axis and a movable rod articulated in rotation at its end on the complementary element about the fourth swivel axis.

6. The agricultural distribution machine according to claim 1, wherein the first, second, third and fourth swivel axes are parallel to one another.

7. The agricultural distribution machine according to claim 1, wherein the rotation switch comprises:
   a driven lock and a spring rigidly fastened to the complementary element or the door, respectively, and
   a cam and indexing track cooperating with the driven lock and being rigidly fastened to the door or the complementary element, respectively, including two indexing notches, preferably in the form of a circular arc, each of which is able to receive, under the effect of the resetting force of the spring exerted on the driven lock, one end of the driven lock, each indexing notch defining a predetermined rotation position of the complementary element relative to the door.

8. The agricultural distribution machine according to claim 7, wherein the longitudinal axis of the driven lock is substantially parallel to the plane perpendicularly intersecting the mutually parallel second and fourth swivel axes.

9. The agricultural distribution machine according to claim 2, wherein the one rotation switch extends substantially in the vicinity of the second swivel axis.

\* \* \* \* \*